(12) United States Patent
Voudouris (10) Patent No.: US 11,612,456 B2
(45) Date of Patent: Mar. 28, 2023

(54) CLEAR PLASTIC ALIGNER PROTRUSIONS FOR ANTERIOR OR OPEN BITE TREATMENT AND MATTRESS PLASTIC MATERIAL FOR INVISIBLE ALIGNERS

(71) Applicant: Spartan Orthodontics Inc., Toronto (CA)

(72) Inventor: John Voudouris, Toronto (CA)

(73) Assignee: Spartan Orthodontics Inc., Toronto (CA)

( * ) Notice: Subject to any disclaimer, the term of this patent is extended or adjusted under 35 U.S.C. 154(b) by 322 days.

(21) Appl. No.: 16/610,799

(22) PCT Filed: Apr. 30, 2018

(86) PCT No.: PCT/CA2018/000081
§ 371 (c)(1),
(2) Date: Nov. 4, 2019

(87) PCT Pub. No.: WO2018/201220
PCT Pub. Date: Nov. 8, 2018

(65) Prior Publication Data
US 2021/0282900 A1    Sep. 16, 2021

Related U.S. Application Data

(60) Provisional application No. 62/500,840, filed on May 3, 2017.

(51) Int. Cl.
*A61C 7/08*    (2006.01)
(52) U.S. Cl.
CPC ..................................... *A61C 7/08* (2013.01)

(58) Field of Classification Search
CPC .... A61C 7/00; A61C 7/08; A61C 7/36; A63B 23/03; A63B 23/032; A61F 5/56;
(Continued)

(56) References Cited

U.S. PATENT DOCUMENTS

| 4,608,974 | A | * | 9/1986 | Sicurelli, Jr. | ............. | A61F 5/00 128/860 |
| 4,784,605 | A | | 11/1988 | Bergersen | | |

(Continued)

FOREIGN PATENT DOCUMENTS

WO    WO-2006096558 A2  *  9/2006  ............. A61C 9/002

OTHER PUBLICATIONS

"How to Create an Essix (R) Clear Retainer" —Dentsply Raintree Essix (R) —RTE-018-13 Rev. 05/14.

*Primary Examiner* — Ralph A Lewis
*Assistant Examiner* — Mirayda A Aponte
(74) *Attorney, Agent, or Firm* — McMillan LLP (57) ABSTRACT

Protrusions or holes with jagged edges formed on the lingual side of invisible aligner trays are provided. The protrusions or holes irritate the tongue causing it to retract away from the incisors thus eliminating intruding force otherwise exerted by the tongue. A clear corrugated material is provided which is suited for making the aligner trays having the protrusions which otherwise would be difficult with standard thick material used. The lingual side protrusions are added by computer to the impressions taken from a patient's teeth such that the protrusions are formed on the dental model used to make the aligner trays.

7 Claims, 12 Drawing Sheets

(58) Field of Classification Search
CPC .... A61F 5/50; A61F 5/566; A61F 5/58; A61F 2005/563; A61F 5/0016
USPC ........... 433/6, 18, 19, 24, 203.1, 223; 733/6
See application file for complete search history.

(56) References Cited

U.S. PATENT DOCUMENTS

| | | | |
|---|---|---|---|
| D650,066 S | 12/2011 | Boyd | |
| 8,118,592 B2* | 2/2012 | Tortorici | A61C 7/08 433/6 |
| 8,459,989 B2* | 6/2013 | Keski-Nisula | A61C 7/08 433/24 |
| 2002/0192617 A1* | 12/2002 | Phan | A61C 19/003 433/6 |
| 2004/0209218 A1* | 10/2004 | Chishti | A61C 7/36 433/6 |
| 2006/0234179 A1* | 10/2006 | Wen | A61C 7/00 433/6 |
| 2009/0191502 A1* | 7/2009 | Cao | A61C 7/08 433/24 |
| 2011/0020761 A1* | 1/2011 | Kalili | A61C 7/08 433/6 |
| 2013/0298916 A1* | 11/2013 | Alvarez | A61C 5/90 128/861 |
| 2016/0175068 A1* | 6/2016 | Cai | G06F 30/00 700/98 |
| 2016/0310236 A1* | 10/2016 | Kopelman | G06F 30/00 |
| 2018/0078342 A1* | 3/2018 | Gardner | A61C 7/08 |
| 2018/0168788 A1* | 6/2018 | Fernie | A61C 19/063 |
| 2018/0207022 A1* | 7/2018 | Alvarez | A61F 5/566 |

* cited by examiner

CLEAR PLASTIC ALIGNER PROTRUSIONS FOR ANTERIOR OR OPEN BITE TREATMENT AND MATTRESS PLASTIC MATERIAL FOR INVISIBLE ALIGNERS

RELATED APPLICATIONS

This application claims priority from U.S. Provisional Patent Application No. 62/500,840 filed May 3, 2017; the contents of which are herein expressly incorporated by reference in their entirety.

FIELD OF THE INVENTION

The present invention relates generally to orthodontic appliances. More specifically the present invention relates to protrusions formed on clear plastic aligners, for anterior or open bite treatment, and a process of making plastic aligner trays containing the protrusions. In addition, the present invention relates to mattress plastic material used in making invisible aligners containing protrusions.

BACKGROUND OF THE INVENTION

Figure 1A:
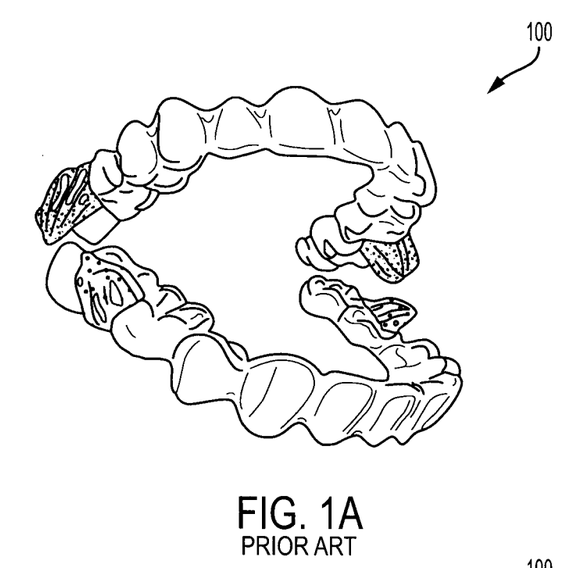
FIG. 1A is perspective view of a maxillary invisible aligner tray, and a mandibular invisible aligner tray.
Figure 1B:
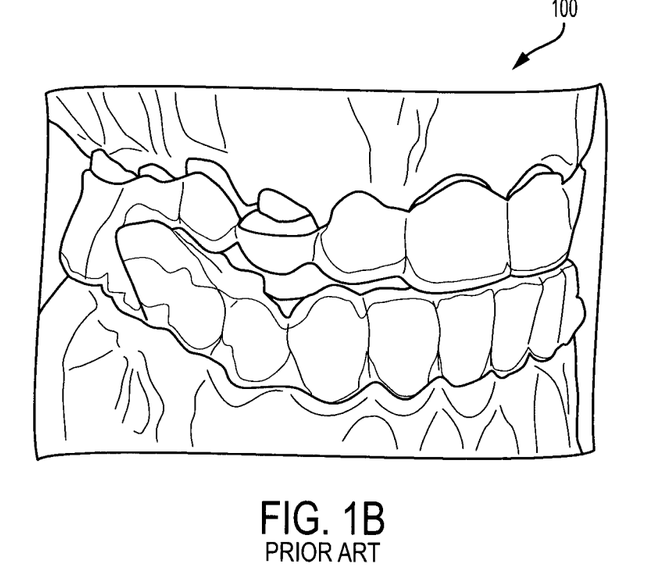
FIG. 1B is a perspective view of the invisible aligner trays of FIG. 1A applied to a patients teeth.

Invisible aligner trays which are elastic positioning appliances for aligning teeth such as aligner tray 100 shown in FIG. 1A, are known. Such appliances comprise a thin shell of elastic material that generally conforms to a patient's teeth but is slightly out of alignment with the initial tooth configuration. Placement of the aligner tray 100 over the teeth, as seen in FIG. 1B, applies controlled forces in specific locations to gradually move the teeth into the new configuration. Repetition of this process with successive appliances comprising new configurations eventually move the teeth through a series of intermediate configurations to a final desired configuration.

Anterior open bite malocclusion is one of the most difficult conditions to treat. Firstly, the tongue unnaturally thrusts or positions forward between the upper and lower incisors to try to establish a seal between the lips for swallowing and eating approximately 600-1000 times per day. This results in the intrusion of the upper and lower incisors away from each other rather than having the normal 20% overlap over each of the upper and lower incisors when the dentition is together during chewing for instance. Second, the tongue has one of the strongest sets of muscles in the human body capable of intruding the upper and lower front six incisors significantly, and of causing the open bite to be resistant to natural closure. As a consequence this makes anterior or lateral open bites difficult to close especially with invisible aligner trays alone since the aligner trays cover the teeth and tend to promote intrusion of the incisors themselves.

Figure 2A:
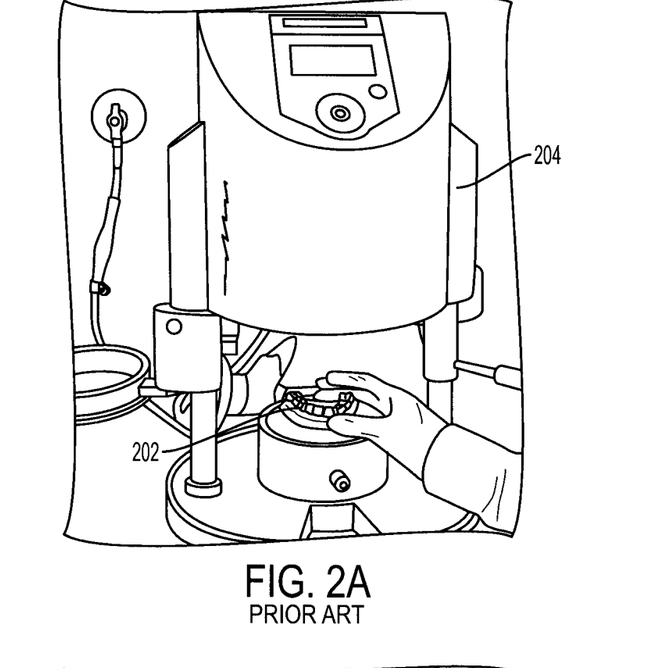
FIG. 2A shows a step of making invisible aligner trays in which a dental model is placed into a machine.
Figure 2B:
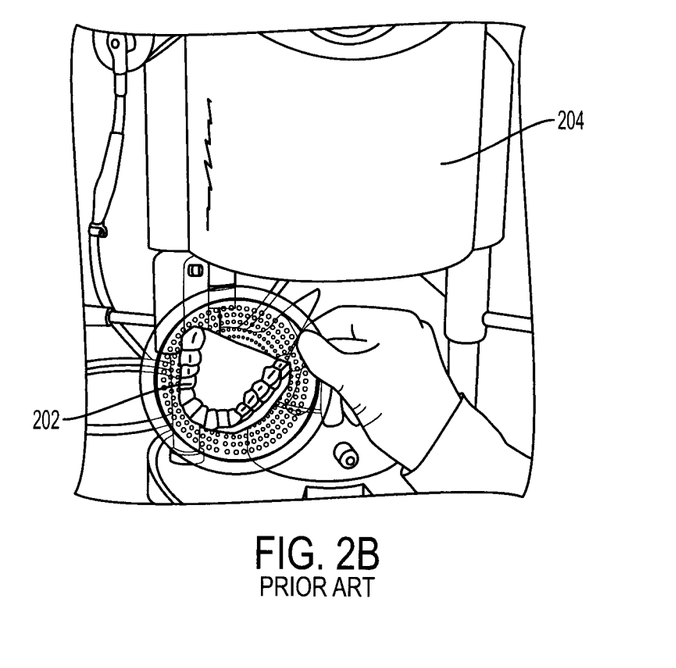
FIG. 2B shows a step in which the dental model is removed from the machine.
Figure 2C:
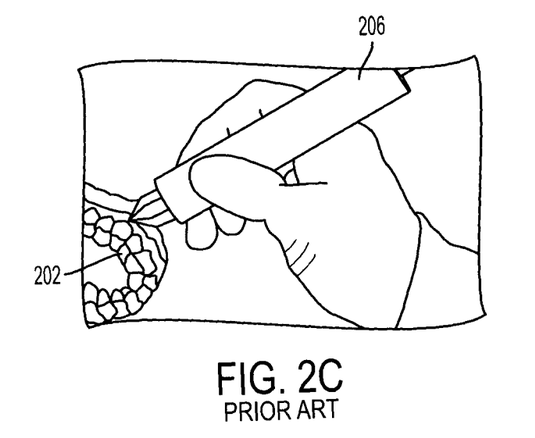
FIG. 2C shows a step of trimming the plastic of the aligner tray using a heating knife.
Figure 2D:
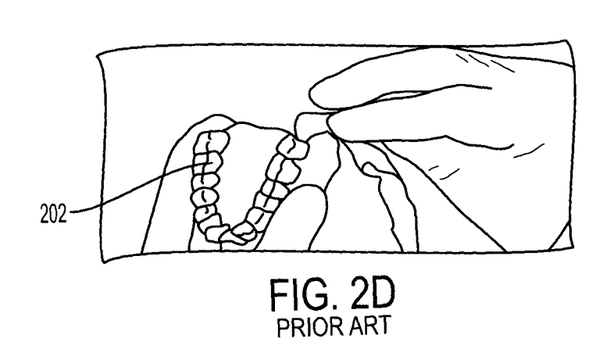
FIG. 2D shows a step of peeling the aligner tray from the dental model.
Figure 2E:
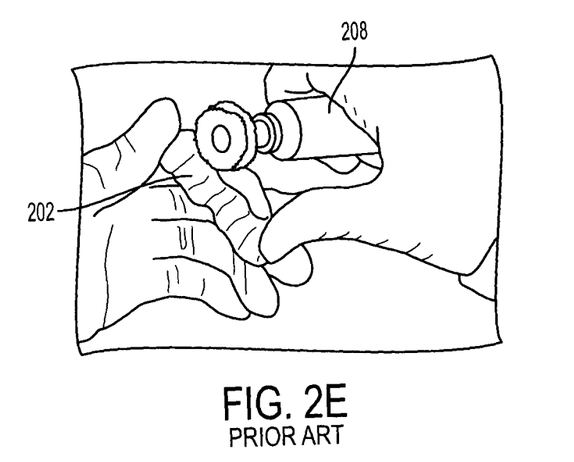
FIG. 2E shows a step of polishing the aligner tray.

In a related matter, it has been difficult to make invisible clear vacuum-formed (also known as thermal formed) retainer aligners to straighten teeth with standard flat clear approximately 1 mm thick Essix® material. The steps shown in FIGS. 2A-2E depict some steps of forming an invisible aligner tray from Essix® material. First, a dental model is created. An in-office 3D scan of the teeth (using an intraoral scanner "3D Shape" for instance) may pre-straighten the teeth by 0.25 mm increments to make the corrected, printed resin dental model. In FIG. 2A, the dental model 202 is placed in the center of the base of a machine 204. The standard flat clear sheet of approximately 1 mm thick Essix® material is initially placed over resin or plaster dental models, heated to soften it, and vacuumed down over the dental model with a "suck-down" method. In FIG. 2B, the molded appliance is removed from the machine. In FIG. 2C using a heat knife 206, lab knife or trimming wheel the plastic is trimmed 1 to 3 mm above the gingival margin from both the lingual and labial surfaces. In FIG. 2D, the appliance is gently removed from the cast. The appliance is finally polished with polishing brushes 208 in FIG. 2E.

An orthodontist can freely make about 10 sets of resin models for Essix® material-like upper and lower retainers to fully straighten mild crowding in an adult patient at a low cost. The process of creating an Essix® material clear retainer is described in the document "How to Create an Essix® material Clear Retainer"—Dentsply Raintree Essix® material—RTE-018-13 Rev. 05/14 which contents are herein incorporated in their entirety by reference.

Essix® ACE Plastic, is thermoformed to fabricate intraoral appliances such as retainers, aligners for minor tooth movement, and temporary bridges. While flat clear sheets from Dentsply Essix® material may be also used for tooth movement, the use encounters a problem. Solid Essix® material is too stiff and wears out in force to move teeth effectively, since it is not flexible enough.

SUMMARY OF THE INVENTION

In one aspect of the present invention, there is provided an orthodontic device for anterior or lateral open bite treatment. The orthodontic device comprises: a plastic aligner tray having a labial-buccal side, a lingual side, and a socket shaped to engage a patient's teeth formed between the lingual side and the labial side; and irritating means for the patient's tongue for preventing the tongue from thrusting against the incisors causing intrusion. The irritating means are formed in the aligner on the lingual side and facing the tongue.

In one embodiment, the irritating means comprise at least one protrusion formed on the lingual side of the plastic aligner facing the tongue.

In one embodiment the protrusion is star-shaped. The star-shaped protrusion may comprise a plurality of wing members extending radially from a center thereof.

In one embodiment, the star-shaped protrusion comprises a horn member at a center thereof extending substantially lingually towards the patient's tongue.

In one embodiment, the star-shaped protrusion comprises a wedge member on a labial surface of at least one of the plurality of wing members.

In another embodiment, the at least one protrusion is cone-shaped having a lingual-facing apex.

In yet another embodiment, the least one protrusion is diamond-shaped.

In one embodiment, the diamond-shaped protrusion comprises a lingual-facing pointed edge.

In one embodiment, the diamond-shaped protrusion comprises a plurality of side pointed edges.

In another embodiment, the irritating means comprise at least one hole formed on the lingual side of the aligner tray, the at least one hole having a plurality of jagged edges.

In another aspect of the present invention, there is provided a flexible clear corrugated aligner material for use in making the orthodontic device, the material comprising a plurality of parallel corrugated sections joined to one another for providing flexibility when formed around a dental model.

In one embodiment, the flexible clear corrugated linear material further comprises a plurality of longitudinal gaps separating adjacent pairs of the parallel corrugated sections.

In one embodiment, the plurality of longitudinal gaps are centered like a barbell between the plurality of parallel corrugated sections.

In one embodiment, the corrugated sections are flattened prior to thermal forming over a resin or plaster dental model.

In yet another aspect of the present invention, there is provided a process for making a plastic aligner tray having lingual-facing protrusions, the process comprising: obtaining impressions of a patient's teeth and feeding the impressions into a computer for generating a dental model of the patient's teeth; modifying the impressions to add star, cone-shaped, or diamond-shaped protrusions thereto; generating a dental model of a patient's teeth, including the protrusions; and preparing an aligner tray on the dental model such that the aligner tray contains the protrusions.

BRIEF DESCRIPTION OF THE DRAWINGS

An embodiment will now be described, by way of example only, with reference to the attached figures, wherein.

DETAILED DESCRIPTION OF THE EMBODIMENT

In order to address the anterior open bite malocclusion issue described above, there is provided irritating means to remind the tongue to stay back behind the teeth when using aligner trays, such as the clear Invisalign® aligner. The irritating means inflict minor pain on the tongue causing it to retract, thus preventing it from thrusting against the front incisors and applying intrusion force to the front incisors.

Figure 3A:
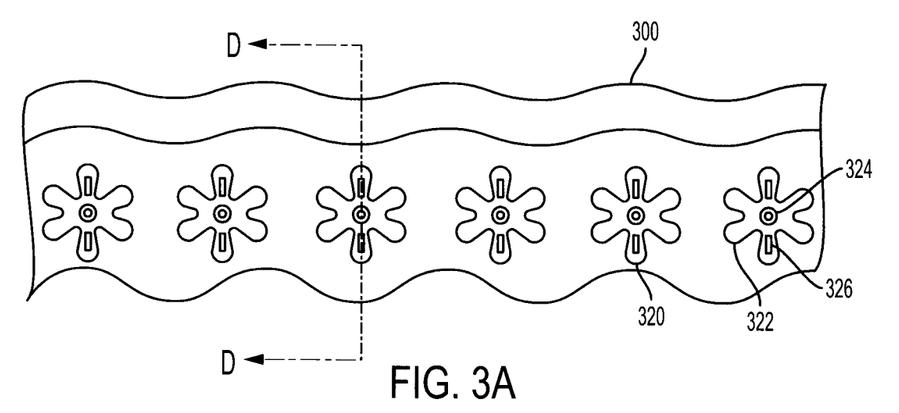
FIG. 3A is a three-quarter view of an upper aligner tray with six protrusions having a star configuration in accordance with the embodiment of the present invention.
Figure 3B:
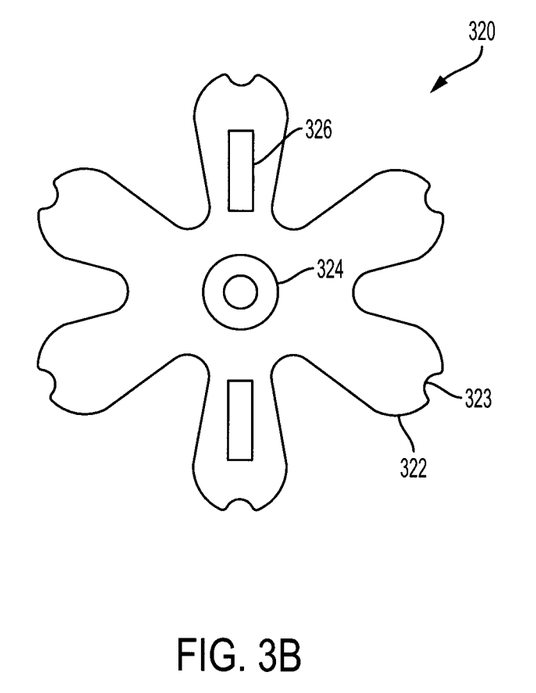
FIG. 3B is an enlarged front view of one of the six protrusions of FIG. 3A.
Figure 3C:
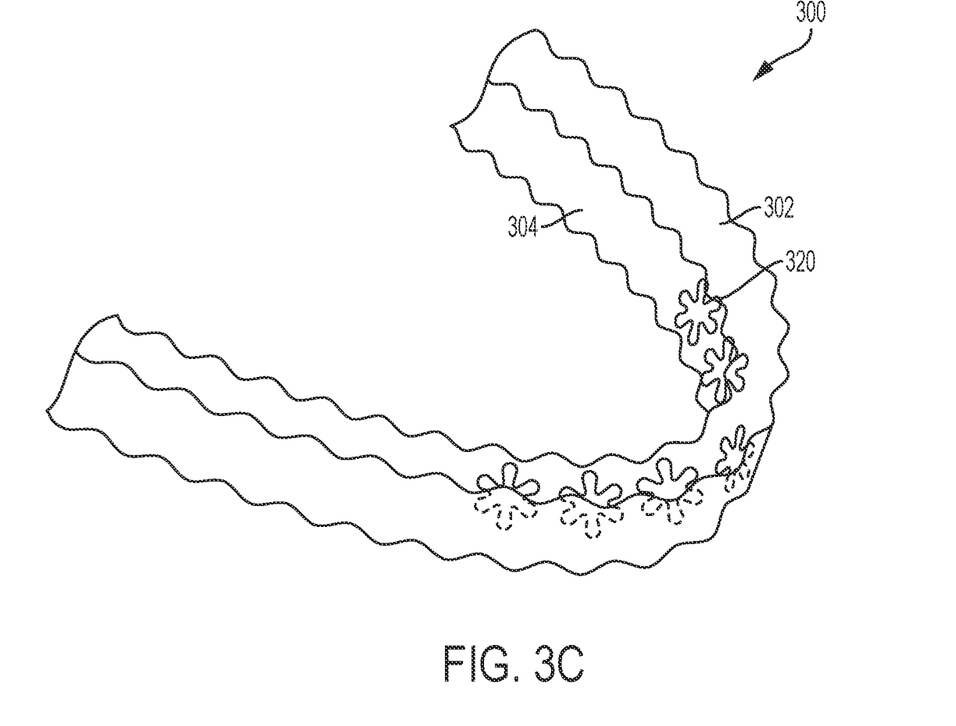
FIG. 3C is a perspective gingival view of the upper aligner tray of FIG. 3A.
Figure 3D:
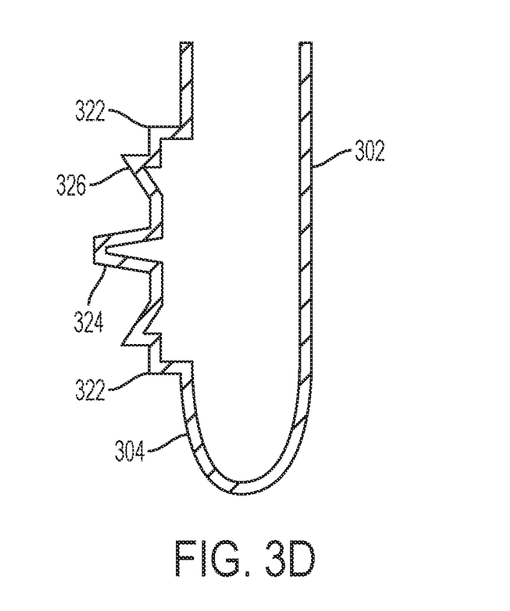
FIG. 3D is a cross-sectional view through an upper incisor portion of the aligner tray of FIG. 3A taken at line D-D.

With reference to FIGS. 3A, and 3C-3D there is shown an upper Invisalign® aligner tray 300 having a labial-buccal side 302, a lingual side 304, and a socket area shaped to receive a patient's teeth formed between the labial-buccal side 302 and the lingual side 304. Lingual protrusions 320 having a star configuration are formed in the lingual side 304 of tray 300 in a direction facing the tongue. The star protrusions 320 may comprise six wing members 322 extending radially from a center thereof. Other numbers of wing members such as 3, 4, 5, 7 or 8 may also be used. In one embodiment, a notch 323 is formed on the outwardly facing surface of the wing members. The star protrusion also features a horn-shaped member 324 at a center thereof, the horn member extending substantially lingually towards the tongue of a patient wearing the aligner tray. The horn-shaped member 324 extending lingually towards the tongue. In another embodiment, at least one wedge member 326 is formed on the lingual surface of at least one wing member 322. The star protrusion shown in FIGS. 3A-3D features two wedge members 326. The protrusions 320 work by negative conditioning. When the tongue touches the protrusions, it is irritated as it comes in contact with one or more of: the horn-shaped member, the wedge members, and the wing members. As a result, the tongue will retract allowing the corresponding linear tray to extrude the upper and lower incisors (often with labial clear attachment resins). More specifically, if the tongue touches the protrusions 320 in the labial-lingual direction, the horn 324 irritates the tongue causing it to retract. The wedge members 326 provide additional irritation to the tongue causing it to retract. The wing members 322 and the notches formed thereon serve to irritate the tongue in the mesio-distal direction particularly if the tip of the tongue is between two star protrusions. Advantageously, the tongue retracts and does not exert intruding forces on the upper or lower incisors.

Figure 4A:
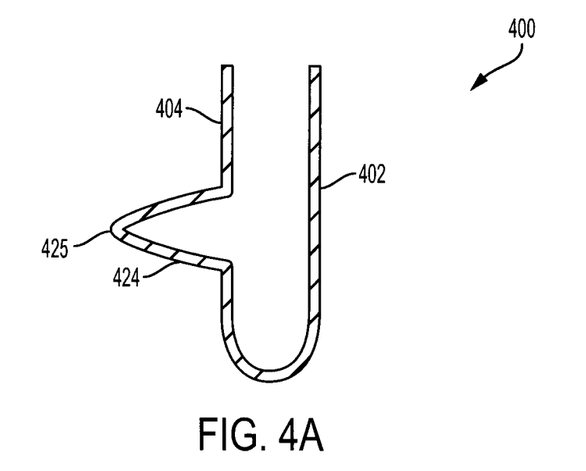
FIG. 4A is a cross-sectional view through an upper incisor portion of an upper aligner tray with protrusions having a cone-shaped (or horn) configuration, in accordance with another embodiment of the present invention.
Figure 4B:
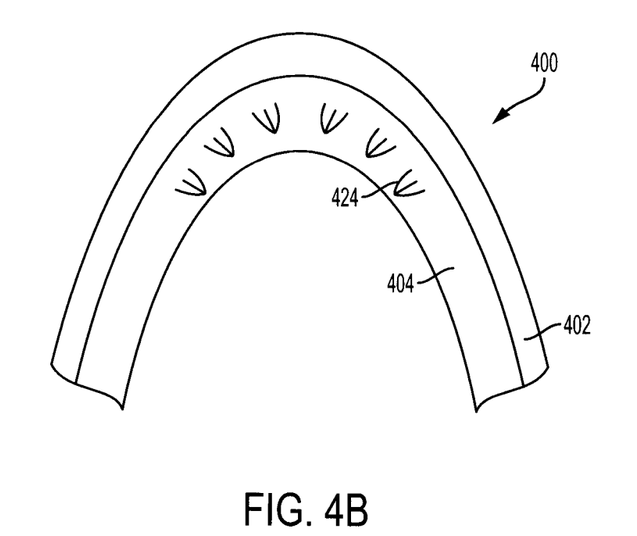
FIG. 4B is a palatal view of the aligner tray of FIG. 4A showing six protrusions having a cone-shaped configuration.

FIG. 4A is a cross-sectional view through an upper incisor portion of an Invisalign® aligner tray 400 having a labial side 402, a lingual side 404, and a socket area shaped to receive a patient's teeth formed between the labial-buccal side 402 and the lingual side 404. A cone-shaped protrusion 424 is formed on the lingual surface 404 with the apex 425 thereof facing away from the lingual surface 404. FIG. 4B is a palatal view of an aligner tray showing six cone-shaped protrusions 424 each having a lingual-facing apex 425, in accordance with another embodiment of the present invention. The cone-shaped protrusions 424 are simpler than the star configuration of FIGS. 3A-3D, and are easier to form on a dental model used in making the aligner tray.

Figure 5A:
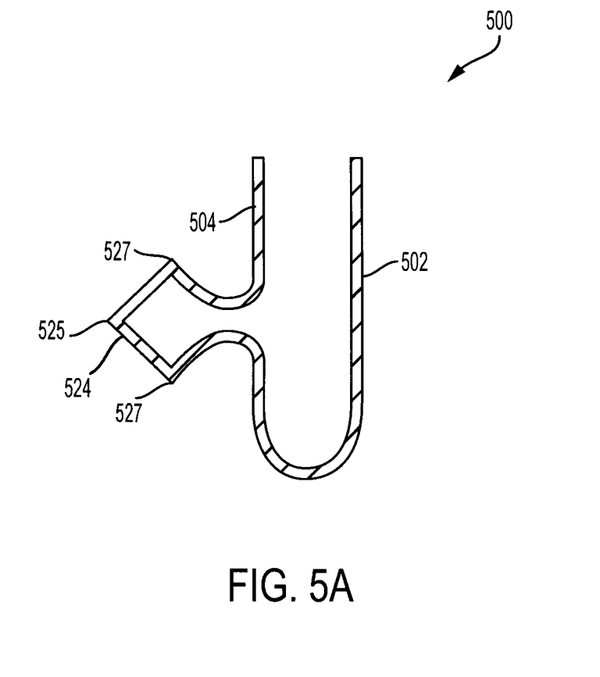
FIG. 5A is a cross-sectional view through an upper incisor portion of an upper aligner tray with protrusions having a diamond-shaped configuration, in accordance with yet another embodiment of the present invention
Figure 5B:
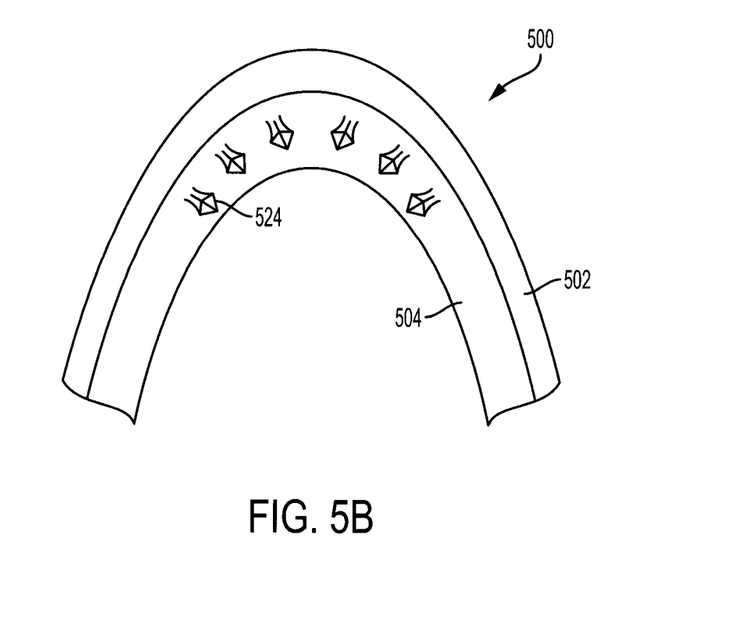
FIG. 5B is a palatal view of the aligner tray of FIG. 5A showing six protrusions having a diamond-shaped configuration.

In yet another embodiment, FIGS. 5A-5B show an aligner tray 500 having a labial side 502, a lingual side 504, and a socket area shaped to receive a patient's teeth formed between the labial-buccal side 502 and the lingual side 504. Diamond-shaped protrusions 524 are formed on the lingual surface 504 facing the tongue. The diamond shaped protrusions 524 are simple to form on a dental model, and advantageously have multiple pointed edges 525 and 527 which can irritate the tongue from multiple directions. Central lingual-facing pointed edge 525 irritates the tongue if it is advanced towards the protrusion from a straight lingual direction. Side pointed edges 527 serve to irritate the tongue if it approaches the protrusion 524 from the side, or if the tip of the tongue is between two adjacent diamond protrusions 524. Advantageously the tongue retracts thus the intruding force thereof on the incisors is averted.

The protrusions 320, 424, and 524 may be formed on the aligner tray so that they are positioned near the middle or lower third of the incisors to allow the incisors to re-extrude with aligner therapy. Aligners 300, 400, and 500 having protrusions 320, 424, and 524 respectively may be used in children, teens or adults as well to restrict and retract tongue thrusting or anterior tongue positioning.

The protrusions on the aligners may be ordered or made in a lab. Between 1 and 28 of the protrusions may be added to aligner trays. It is customary to have six protrusions per aligner as depicted in FIGS. 3A, 3C, 4B and 5B;

Usually, there are a total of 12 protrusions, with 6 at the lingual side of each of the upper and lower front teeth from canine to canine. However, when there are additional lateral open bites the protrusions may be placed from the palatal of the upper molars forward to the premolars as well as the incisors. This may occur for both the upper and lower aligners for a maximum total of 28 protrusions intraorally on all the dentitions, for example.

The protrusions presented above are formed in the dental model over which the aligner tray is formed. This may be done in software after impressions of the patient's teeth are taken and fed into a computer for generating a dental model. Prior to generating the model, the impressions may be modified to add star, cone-shaped, diamonds-shaped, or any other suitably shaped protrusions.

Figure 6A:
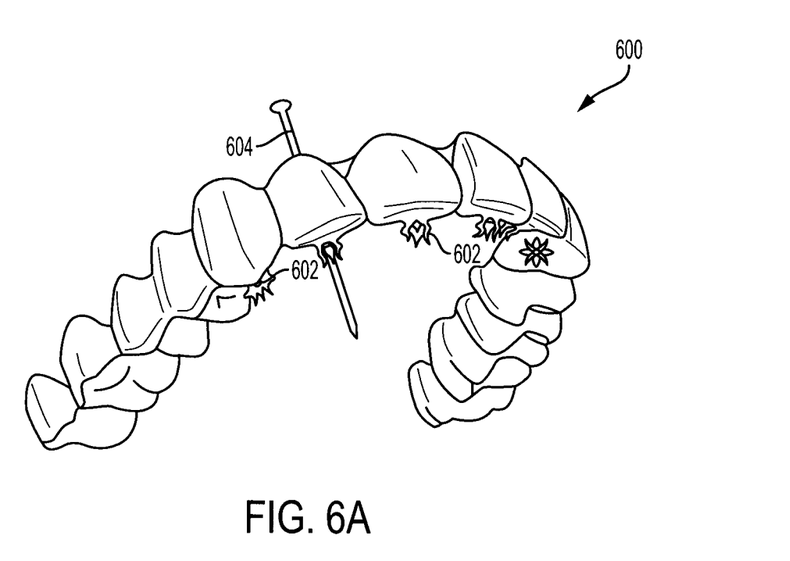
FIG. 6A is a perspective mesial-occlusal view showing the process of puncturing holes on the lingual side of the anterior portion of an upper aligner tray using a pin.
Figure 6B:
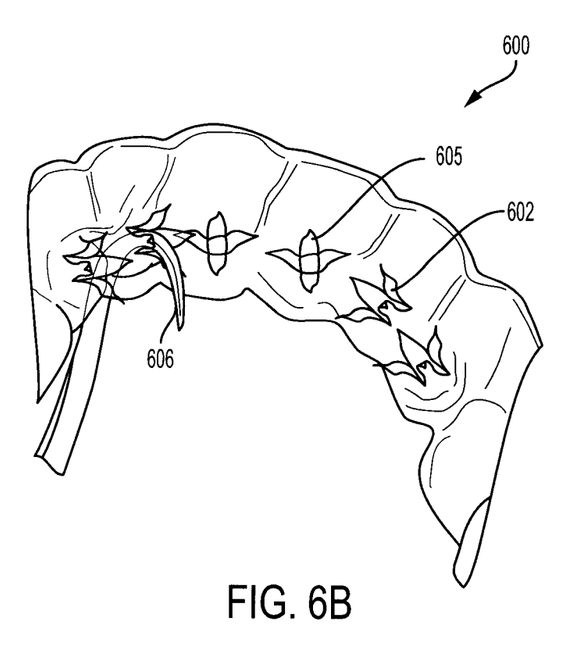
FIG. 6B is a partial perspective mesial-occlusal view showing the process of puncturing holes on the lingual side of the anterior portion of an upper aligner tray using a dental tool.
Figure 6C:
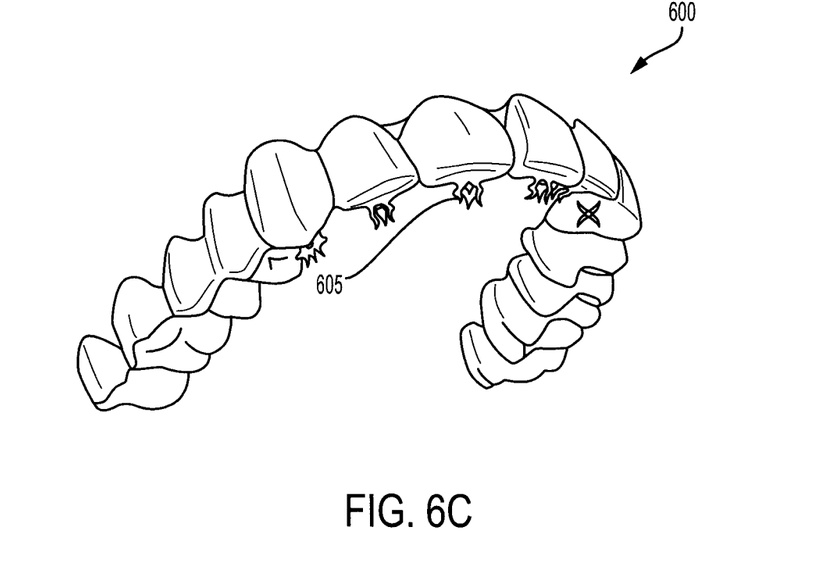
FIGS. 6C-6E are partial perspective views showing holes formed on an invisible aligner tray.
Figure 6D:
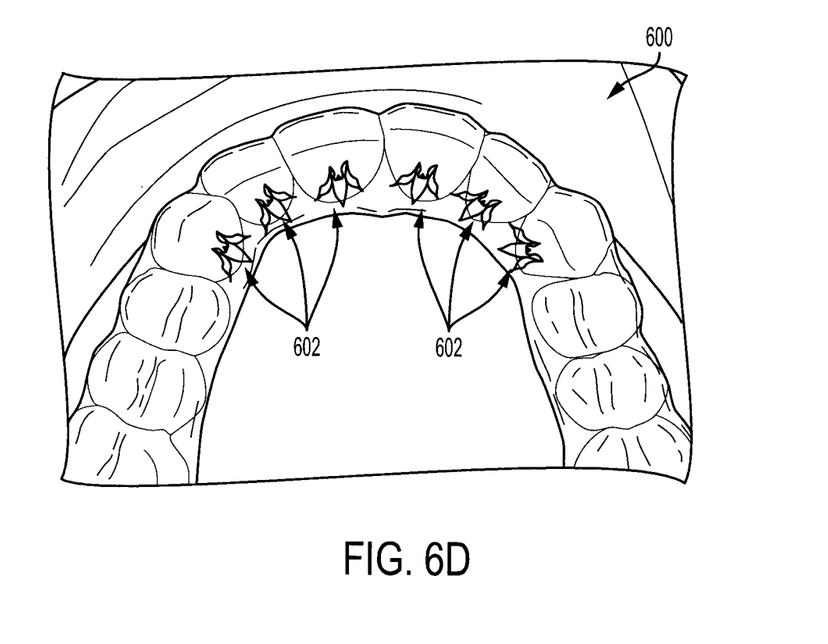
Figure 6E:
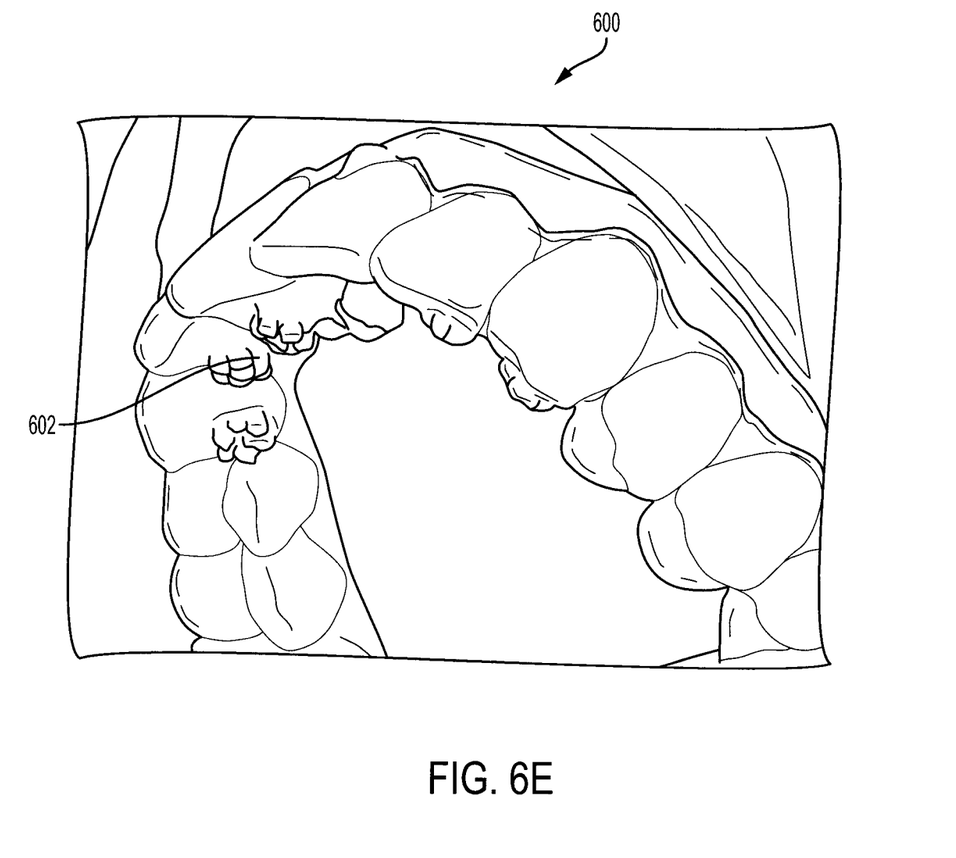

In another embodiment, another modification to the invisible aligner trays is presented with reference to FIGS. 6A-6E. An invisible aligner tray 600 is punctured either with a pin 604 as shown in FIG. 6A, or with a dental tool 606 as shown in FIG. 6B. The puncturing is done in the lingual direction in the lingual side of the aligner tray. As a consequence holes or apertures 602 are formed. The apertures 602 are surrounded by aligner material having jagged edges 605 as a result of the puncturing. The jagged edges 605 serve to irritate the tongue so it retracts and stays away from the aligner tray. Advantageously, the tongues intruding force on the front incisors is averted.

A difficulty arises when forming the protrusions in the aligners. If a stiff thermoplastic is used, the protrusions, whether star-shaped or Cone-shaped, are not formed accurately around the corresponding protrusions in the dental model. For example, difficulty may be encountered making invisible clear vacuum-formed trays to straighten teeth with standard flat clear approximately 1 mm thick Essix® material, as described above.

Figure 7A:
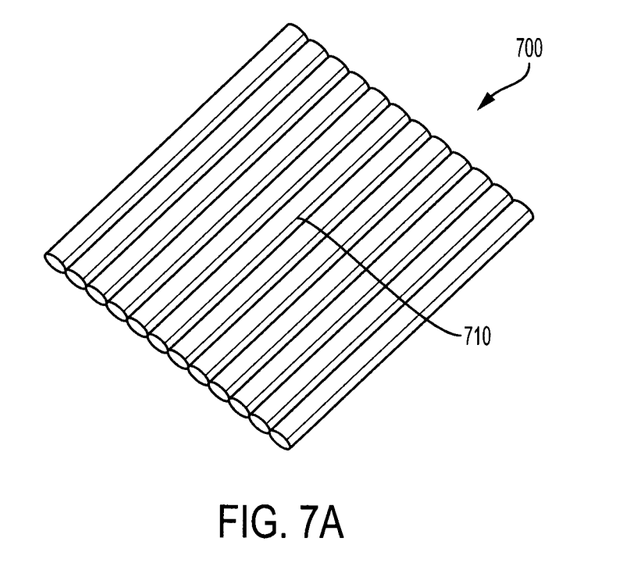
FIG. 7A is a perspective view of flexible clear corrugated aligner material that may be thermoformed in a plastic-like manner over a dental model, in accordance with an embodiment of the present invention.
Figure 7B:
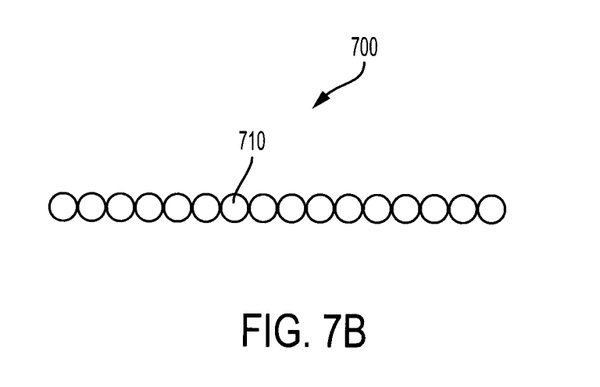
FIG. 7B is a side view of the corrugated aligner material of FIG. 7A.
Figure 8A:
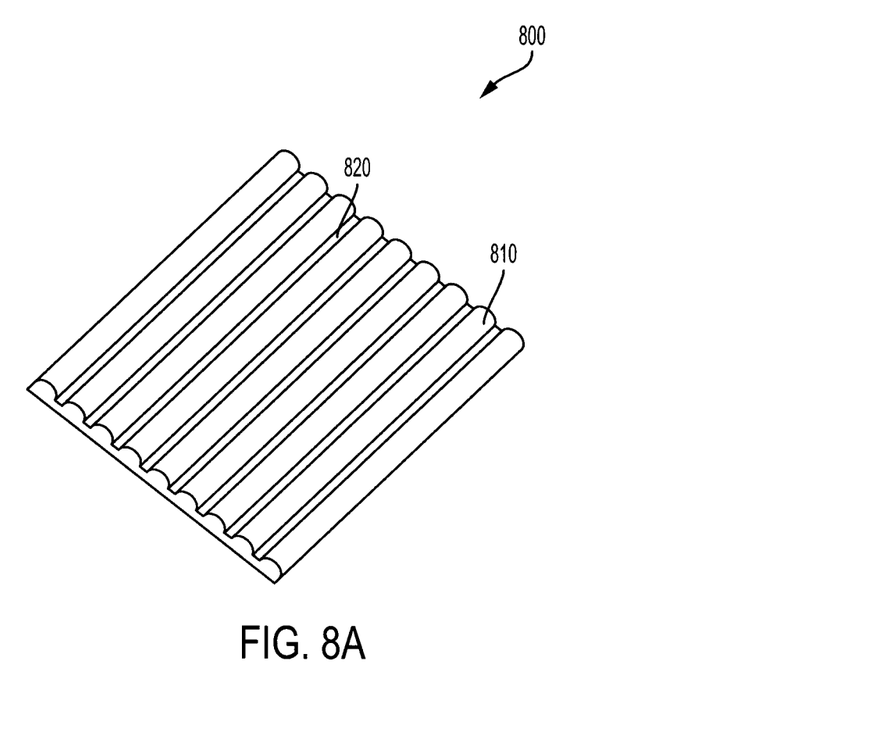
FIG. 8A is a perspective view of flexible clear corrugated aligner material, having gaps between the corrugations that can be flattened or bead-like, in accordance with another embodiment of the present invention.
Figure 8B:
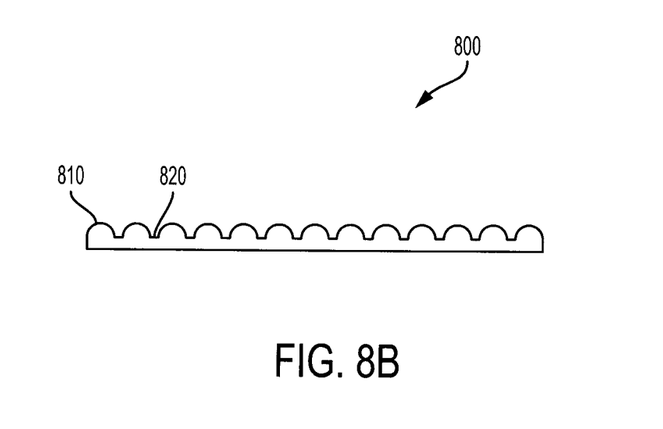
FIG. 8B is a side view of the corrugated aligner material of FIG. 8A.

FIGS. 7A-7B and FIGS. 8A-8B depict two embodiments to address the problem caused by the standard flat confluent Essix® material being too stiff and inflexible, as mentioned above. The corrugated plastic-like material shapes provide flexibility so that the material is able to be thermal formed over resin dental models. FIG. 7A is a perspective view of a sheet of flexible clear corrugated aligner material 700 that may be thermoformed in a plastic-like manner over a dental model, in accordance with an embodiment of the present invention. FIG. 7B is a side view of the sheet of flexible material 700. Material 700 is formed of a plurality of parallel corrugations 710 joined to one another. FIG. 8A is a perspective view of an alternative embodiment of flexible clear corrugated aligner material 800, having flat, similar, and plastic-like longitudinal gaps 820 on the sheet of plastic-like material 800 separating the corrugations 810. In some embodiments (not shown) the gaps may be centered like a barbell between the corrugations 710. The corrugations 710 and 810 may also be raised (either elliptical or rounded), or flattened before thermal forming over a resin or plaster dental model. Advantageously, this corrugated material is better suited to take the form of the protrusions formed on the dental mode, when the invisible aligner tray is formed on the dental model as explained above.

The invention claimed is:

1. An orthodontic device for anterior or lateral open bite treatment, comprising:
   a plastic aligner tray having a labial-buccal side, a lingual side, and a socket shaped to engage a patient's teeth and defined by the lingual side and the labial-buccal side; and
   an irritating means for the patient's tongue for preventing the tongue from thrusting against the incisors causing intrusion, the irritating means formed in the aligner tray on the lingual side and facing the tongue, the irritating means having a lingual-facing end shaped to cause the tongue to retract upon the tongue touching the irritating means;
   wherein the aligner tray is made of a flexible clear corrugated aligner material comprising a plurality of parallel corrugated sections joined to one another for providing flexibility when formed around a dental model;
   wherein the irritating means comprise at least one protrusion formed on the lingual side of the plastic aligner tray facing the tongue;
   wherein the at least one protrusion is diamond-shaped; and
   wherein the diamond-shaped protrusion comprises a lingual-facing pointed edge.

2. The orthodontic device of claim 1, wherein the diamond-shaped protrusion comprises a plurality of side pointed edges.

3. The orthodontic device of claim 1, wherein the irritating means comprises at least one hole formed on the lingual side of the aligner tray, the at least one hole having a plurality of jagged edges.

4. The orthodontic device of claim 1, wherein the flexible clear corrugated aligner material further comprises a plurality of longitudinal gaps separating adjacent pairs of the parallel corrugated sections.

5. The orthodontic device of claim 4, wherein the plurality of parallel corrugated sections are spaced from one another.

6. A process for making a plastic aligner tray having lingual-facing protrusions, the process comprising:

obtaining impressions of a patient's teeth and feeding the impressions into a computer for generating a dental model of the patient's teeth;

modifying the impressions to add a plurality of protrusions on the lingual side and facing the tongue, the protrusions having a lingual-facing end shaped to cause the tongue to retract upon the tongue touching the protrusions;

generating a dental model of a patient's teeth, including the protrusions;

thermal forming on the dental model a sheet of flexible clear corrugated aligner material comprising a plurality of parallel corrugated sections joined to one another such as to form an aligner tray containing a plurality of protrusions; and flattening the corrugated sections prior to thermal forming over the dental model.

7. The process of claim 6, further comprising puncturing an aperture in the lingual side of the aligner tray in a lingual direction to form jagged edges of aligner material around the aperture.

* * * * *